A. E. WHITTIER.
MECHANICAL THERMOMETER.
APPLICATION FILED FEB. 28, 1918.
1,273,707.
Patented July 23, 1918.
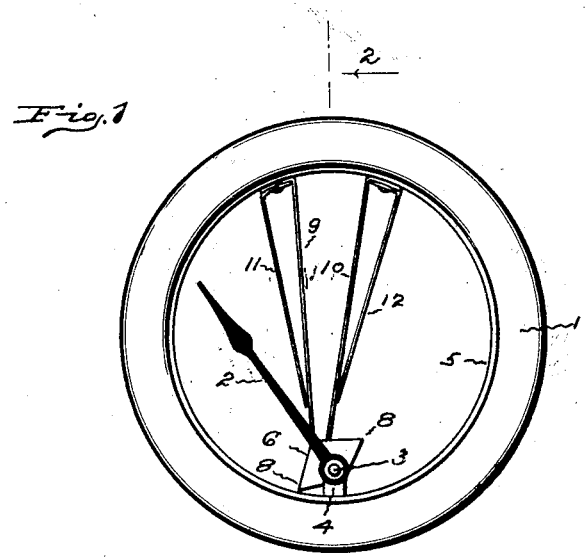
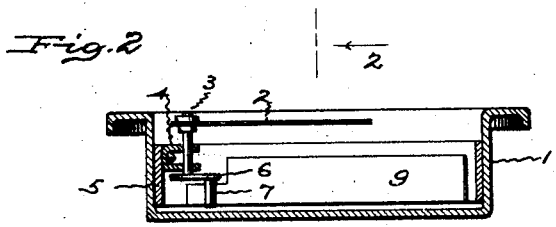
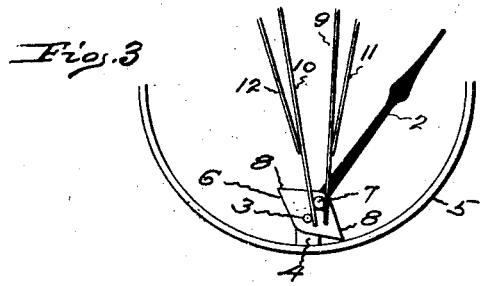
INVENTOR.
Albert E. Whittier
BY
Harry P. William
ATTORNEY.

UNITED STATES PATENT OFFICE.

ALBERT E. WHITTIER, OF BRISTOL, CONNECTICUT.

MECHANICAL THERMOMETER.

1,273,707. Specification of Letters Patent. Patented July 23, 1918.

Application filed February 28, 1918. Serial No. 219,569.

*To all whom it may concern:*

Be it known that I, ALBERT E. WHITTIER, a citizen of the United States, residing at Bristol, in the county of Hartford and State of Connecticut, have invented a new and useful Improvement in Mechanical Thermometers, of which the following is a specification.

This invention relates to those mechanical thermometers which have an indicating pointer that is given its movements for indicating the degree of temperature by means of thermo-responsive fingers, of the type shown in U. S. Patent No. 1,235,623 issued to me August 7, 1917.

The object of the invention is to so construct such a thermometer that the pointer will have an extended travel with slight changes of temperature and will move uniformly and steadily when it alters its position as the temperature varies and at the same time while reliable and sensitive will not swing and vibrate when subjected to jar or shock.

As a result of the attainment of this object a thermometer is provided which, while serviceable for many general purposes, such as indicating the temperature of water in boilers and water heating systems, is particularly adapted for use where it is subjected to vibration, such, for instance, as when applied to an automobile for indicating the temperature of the cooling water in the radiating system where it will be subjected to continuous and violent vibration.

Figure 1 of the accompanying drawings shows a plan of a thermometer of the type mentioned constructed according to this invention, with the cover and dial omitted so as to expose the actuating mechanism in the interior. Fig. 2 shows a section on the plane indicated by the dotted line 2—2 on Fig. 1. Fig. 3 is a view looking from the underside showing the ends of the thermoresponsive fingers and the parts attached to the spindle with which the fingers coöperate for moving the indicating pointer.

These thermometers usually have a circular sheet metal case 1 which is designed to fit into the wall of a water chamber, oven or other structure as the case may be. In the thermometer illustrated the indicating pointer 2 is fastened to the end of a spindle 3 which is mounted in an opening in the piece 4 that is attached near one side of the case to the metal ring 5 which is sprung into the case. A thin metal plate 6 is fastened to the inner end of the spindle and projecting inwardly from this plate a slight distance at one side of the axis of the spindle is a stud 7. The ends 8 of the plate form stops which engage with the ring for limiting the rotation of the spindle and movements of the pointer carried thereby.

In the form of the thermometer shown four thin fingers 9, 10, 11, 12, made of common thermo-metric metal so that they will warp when heated and straighten when cooled, are fastened to the ring substantially diametrically opposite to the spindle. The two inner fingers 9, 10 are extended so that their free ends press loosely and lightly on opposite sides of the stud projecting from the plate fastened to the pointer spindle, and the two outer fingers 11, 12 are arranged to have their free ends press against the outside of the fingers 9, 10 near their free ends. These fingers are quite thin and flexible and are so set that they all warp in the same direction when heated and all straighten in the same direction when cooled.

As a result of this arrangement when the temperature rises the finger 9 warps and pushes the stud so as to turn the pointer up and simultaneously the finger 10 warps in the same direction but away from the stud so that it offers but slight resistance to the push of the other finger. When the temperature drops the reverse action takes place, that is, the finger 10 straightens and pushes against the stud while simultaneously the finger 9 straightens and yields so as to reduce to a minimum its resistance to the movement of the stud. The fingers 11, 12 act simultaneously in the same direction as the fingers 9, 10, the finger 11 pushing and the finger 12 yielding as the temperature rises, and of course the fingers 11, 12 straighten simultaneously with the fingers 9, 10, the finger 12 pushing and the finger 11 yielding as the temperature drops. However, as the fingers 11, 12 are somewhat shorter than the fingers 9, 10 they act slightly differently and this causes the fingers 9, 10 to firmly hold the stud between their ends without materially affecting the sensitiveness of the structure.

In fact with this arrangement notwithstanding that the fingers 9 and 10 are quite long, thin and flexible, and thus are very sensitive even at low temperature, and the distance between the axis of the spindle and the axis of the stud is very short so that slight movements of the fingers cause extended movements of the pointer, the fingers 11 and 12, which are also thin and flexible, and which assist in moving the pointer, so act on the fingers 9 and 10 that the latter hold the stud firmly and prevent the pointer from swinging and vibrating. The pointer is held firmly and is moved up and down uniformly and steadily as the temperature changes and this renders the thermometer very serviceable for use in places where it is subjected to considerable vibration, as for instance when the thermometer is attached to an automobile for indicating the temperature of the cooling water, for, of course, when so used it is subjected to continual and severe vibration, a condition which tends to cause the pointer to continually swing and jump if the thermometric arms are sufficiently sensitive to accurately indicate the desired degrees of temperature.

The invention claimed is:

1. A thermometer having a casing, a spindle rotarily mounted in and near one side of the casing, a pointer on the spindle, a part connected to and offset from the spindle, thermo-responsive fingers attached to the casing and having their free ends pressing against opposite sides of said off-set part, and thermo-responsive fingers fastened to the casing and having their free ends pressing against the first mentioned fingers, said fingers being arranged to all warp in the same direction when heated and all straighten in the opposite direction when cooled.

2. A thermometer having a casing, a spindle rotarily mounted in and near one side of the casing, a pointer on the spindle, a stud connected with and extending parallel to and at one side of the axis of the spindle, thermo-responsive fingers attached to the casing and having their free ends pressing against opposite sides of said stud, and thermo-responsive fingers fastened to the casing and having their free ends pressing against the first mentioned fingers, said fingers being arranged to all warp in the same direction when heated and all straighten in the opposite direction when cooled.

3. A thermometer having a casing, a spindle rotarily mounted in and near one side of the casing, a pointer attached to one end of the spindle, a plate attached to the other end of the spindle, a stud projecting from the plate, a pair of thermo-responsive fingers fastened to the casing and having their free ends pressing against opposite sides of said stud, and a pair of thermo-responsive fingers fastened to the casing and having their free ends pressing against the first mentioned fingers, said fingers being arranged to all warp in the same direction when heated and all straighten in the opposite direction when cooled.

4. A thermometer having a metallic ring, a spindle rotarily supported from and near one side of the ring, a pointer fastened to said spindle, a stud connected with and extending parallel to and at one side of the axis of the spindle, thermo-responsive fingers fastened to said ring and pressing against opposite sides of said stud, and thermo-responsive fingers fastened to said ring and pressing against the backs of the first mentioned fingers, all of said fingers being thermo-responsive in the same direction.

ALBERT E. WHITTIER.